United States Patent
DeLuca et al.

(10) Patent No.: US 9,329,021 B1
(45) Date of Patent: May 3, 2016

(54) SYSTEM AND METHODS FOR USE IN MONITORING A STRUCTURE

(71) Applicants: The Boeing Company, Seal Beach, CA (US); University of Delaware, Newark, DE (US)

(72) Inventors: Michael J. DeLuca, Schwenksville, PA (US); Christopher J. Felker, Downingtown, PA (US); Dirk Heider, Newark, DE (US); Gaurav Pandey, Newark, DE (US); Ahmad Abu-Obaid, Newark, DE (US); Erik T. Thostenson, Newark, DE (US); John W. Gillespie, Jr., Hockessin, DE (US)

(73) Assignees: The Boeing Company, Chicago, IL (US); University of Delaware, Newark, DE (US)

( * ) Notice: Subject to any disclaimer, the term of this patent is extended or adjusted under 35 U.S.C. 154(b) by 230 days.

(21) Appl. No.: 13/887,592

(22) Filed: May 6, 2013

(51) Int. Cl.
*G01B 7/16* (2006.01)

(52) U.S. Cl.
CPC .................................. *G01B 7/18* (2013.01)

(58) Field of Classification Search
CPC B29C 47/0004; B29C 55/00; B29C 47/0021; B29C 47/402; B29C 47/40; B29C 47/38; B29C 47/6012; B82Y 30/00; B82Y 15/00; C08K 7/24; C08K 3/04; B29K 2105/06; B29K 2105/162
See application file for complete search history.

(56) References Cited

U.S. PATENT DOCUMENTS

| 7,786,736 | B2 | 8/2010 | Thostenson et al. |
| 8,354,593 | B2 | 1/2013 | White et al. |
| 2009/0277897 | A1 | 11/2009 | Lashmore et al. |

*Primary Examiner* — Lisa Caputo
*Assistant Examiner* — Brandi N Hopkins
(74) *Attorney, Agent, or Firm* — Armstrong Teasdale LLP

(57) ABSTRACT

A system for use in monitoring a structure is provided. The system includes a strip of piezoresistive material including nano-elements, electrodes coupled to the strip, and a resistance detector configured to measure a resistance of the strip.

11 Claims, 6 Drawing Sheets

SYSTEM AND METHODS FOR USE IN MONITORING A STRUCTURE

BACKGROUND

The field of the present disclosure relates generally to carbon nano-technology and, more specifically, to systems and methods of monitoring the structural integrity of a structure.

The fabrication of multi-layer laminate structures generally includes bonding layers of metallic (e.g., aluminum, titanium, or corrosion resistant steel (CRES)) and/or non-metallic (e.g., carbon fiber, boron, or fiberglass) reinforcement material together with a matrix material to form a rigid structure. The reinforcement material strengthens and stiffens the laminate structure, and the matrix material supports the reinforcement material after a curing process. Multi-layer laminate structures generally have a high strength-to-weight ratio and may be formed in a variety of shapes and sizes.

Recently, at least some known aircraft components have been fabricated from multi-layer laminate structures of non-metallic composite materials such as carbon-fiber-reinforced polymer (CFRP). The composite materials are used in combination with metallic materials, such as aluminum, titanium, and/or steel, to reduce the weight of the aircraft. As used herein, the term "metallic" may refer to a single metallic material or a metallic alloy material. Reducing the overall weight generally contributes to increasing the fuel efficiency of the aircraft.

However, common multi-layer laminate structures fabricated from CFRP may be susceptible to damage, such as the formation of micro-cracks and delamination of the structure during service. Known damage to such structures may be small and difficult to detect during scheduled maintenance. One known method of detecting structural defects in composite structures is to disperse carbon nanotubes in the polymer matrix used to form the structure. The carbon nanotubes form a conducting network of sensors that detect structural defects based on the piezoresistivity of the carbon nanotubes. Piezoresistivity refers generally to a change in the electrical resistivity of an electrically conductive material as mechanical stresses are induced thereto. As such, changes in the structural integrity of the composite structure may be detected by a change in the electrical resistivity of the polymer matrix containing the carbon nanotubes. However, it may be difficult to determine an exact location of structural defects when the carbon nanotubes are dispersed throughout the laminate structure.

BRIEF DESCRIPTION

In one aspect, a system for use in monitoring a structure is provided. The system includes a strip of piezoresistive material including nano-elements, electrodes coupled to the strip, and a resistance detector configured to measure a resistance of the strip.

In another aspect, a structure fabricated from a plurality of layers of material is provided. The structure includes a first layer of material, a second layer of material, and a sensor system coupled between the first layer and the second layer. The sensor system includes at least one strip of piezoresistive material including nano-elements and a resistance of the strip is measured.

In yet another aspect, a method of fabricating a structure is provided. The method includes providing a first layer of material, positioning a strip of piezoresistive material including nano-elements over the first layer, and positioning a second layer of material over the strip.

In yet another aspect, a method of monitoring a structure is provided. The method includes coupling a strip of piezoresistive material including nano-elements to the structure, inducing at least one of voltage and current to the strip, and measuring a resistance of the strip as the at least one of voltage and current is applied thereto. A change in the resistance determines potential damage to the structure.

DETAILED DESCRIPTION

Implementations of the present disclosure relate to systems and methods that may be used in monitoring the structural integrity of a structure. Exemplary structures include, but are not limited to, an airplane, a building, a boat, a car, a train, a dam, an a road. The structural integrity of the structure is monitored by detecting and/or locating damage to the structure. In the exemplary implementation, the system includes strips of piezoresistive material, such as carbon nanotubes, arranged in a grid-like configuration and integrated with the structure. The strips may be coupled between layers of a laminate structure or coupled to an outer surface of the structure. During operation, a voltage is applied to the strips and a resistance of the strips is measured. The resistance of the strips may be measured in ohms (Q) in accordance with the following equation:

$$R = \rho l / A,$$

where $\rho$ is the resistivity of the material, f, is the length of the material, and A is the cross-sectional area of the material. As such, changes to the dimensions of the strips, such as the length and/or the cross-sectional area, may cause a change in the resistance of the strips. Further, a change in the geometry of a network of carbon nanotubes, for example, may cause a change in the resistance of the strips. More specifically, strain applied to the strips may result in a change in the average tunneling distance between the carbon nanotubes, thereby affecting the material resistivity and average resistance of the network.

A change in the resistance of the strips integrated with the structure may be used to determine and/or locate potential damage to the structure. For example, damage caused by impacts by foreign objects, ply layer delamination, and/or crack propagation may affect the structural integrity of the structure. Such damage may cause a permanent change in the average tunneling distance between the carbon nanotubes and result in a change in the resistance of the strips. As such, a permanent change in the resistance of the strips may indicate the presence of damage to the structure. Further, arranging the strips in a grid-like orientation enables the system described herein to locate the potential damage based on the intensity of the change in resistance in certain strips. As such, maintenance for the structure may be shifted from a time-based schedule approach, to a condition-based approach.

Figure 1:
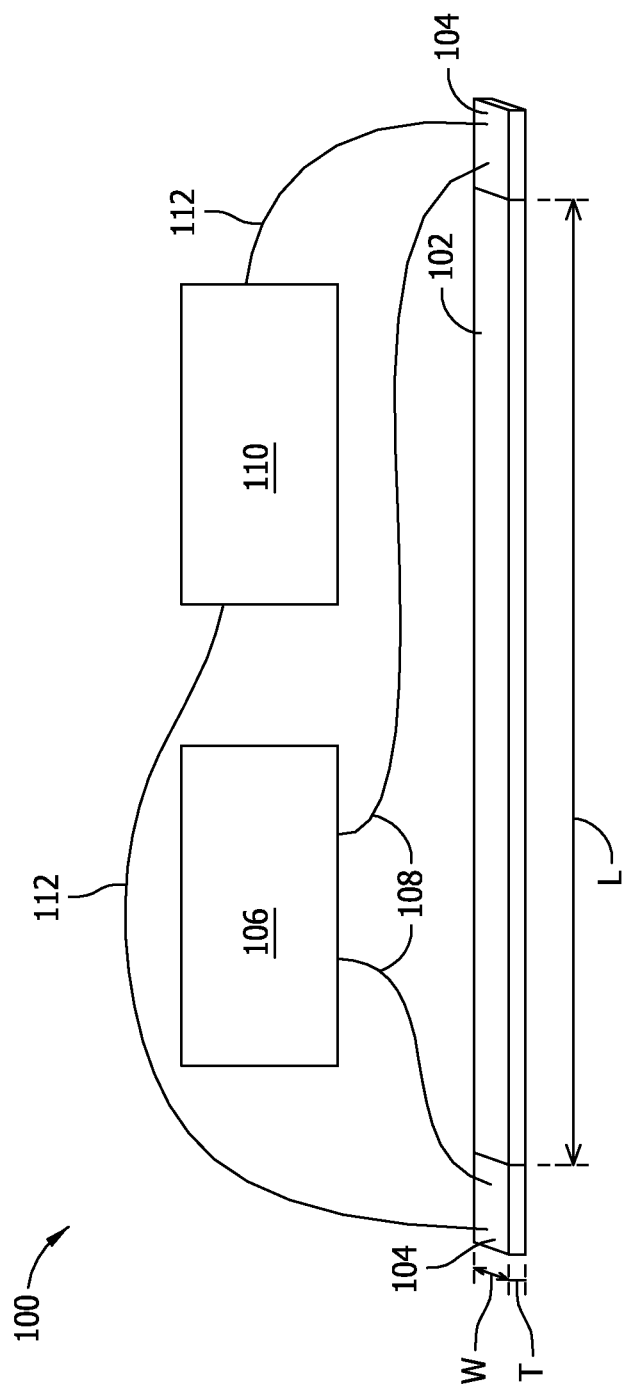
FIG. 1 is schematic illustration of an exemplary sensor.

FIG. 1 is schematic illustration of an exemplary sensor 100 for use in monitoring the structural integrity of a structure (not shown in FIG. 1). In the exemplary implementation, sensor 100 includes a strip 102 of piezoresistive material and a plurality of electrodes 104 coupled to strip 102. Sensor 100 also includes a voltage/current source 106 coupled to electrodes 104 via wires 108, and a resistance detector 110 coupled to electrodes 104 via wires 112. In operation, voltage/current source 106 applies a voltage or current to electrodes 104, and resistance detector 110 measures the resistance of strip 102 to determine and/or locate potential damage to the structure.

In the exemplary implementation, strip 102 may be fabricated from a resin including any suitable piezoresistive material that enables sensor 100 to function as described herein. As used herein, a material is referred to as "piezoresistive" when a change in the resistivity ($\partial \rho$) of the material divided by a change in the strain ($\partial \in$) of the material does not equal zero. Exemplary piezoresistive materials include, but are not limited to, a carbon material, a silicon material, and/or a semiconductive material. In the exemplary implementation, the resin includes a plurality of carbon nano-elements randomly dispersed in a polymer matrix. More specifically, the resin may be formed into a non-woven sheet (not shown) of carbon nano-elements, and strip 102 may be cut therefrom. As such, in the exemplary implementation, strip 102 is a pre-impregnated ("pre-preg") layer of carbon nano-elements. As used herein, a "nano-element" has at least one dimension of less than about 999 nanometers (nm) and, more specifically, less than about 100 nm. Strip 102 may have any shape and/or dimensions that enable sensor 100 to function as described herein. In the exemplary implementation, strip 102 has a length L, a width W, and a thickness T, where length L is greater than width W, and width W is greater than thickness T. In an alternative implementation, strip 102 has an irregular (i.e., not rectangular) shape.

Figure 2:
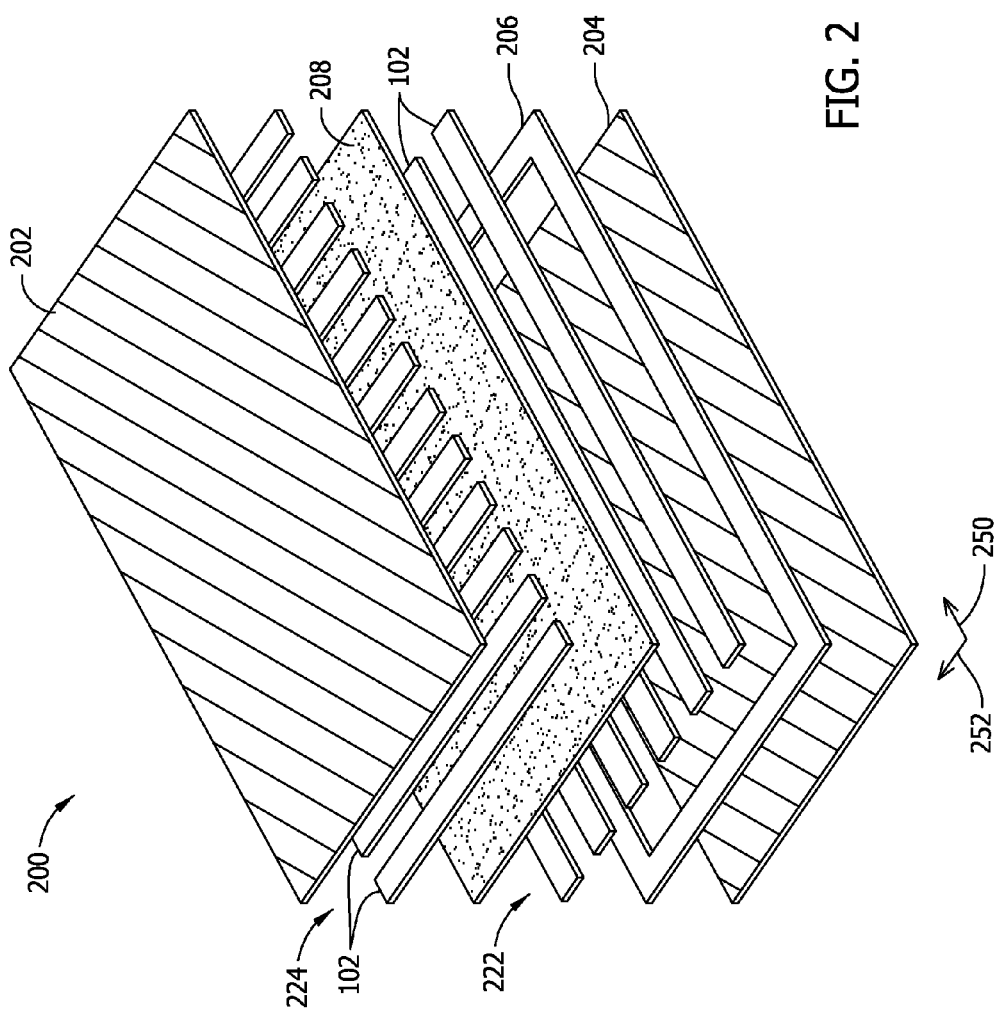
FIG. 2 is an exploded perspective view of an exemplary structure that may use the sensor shown in FIG. 1.
Figure 3:
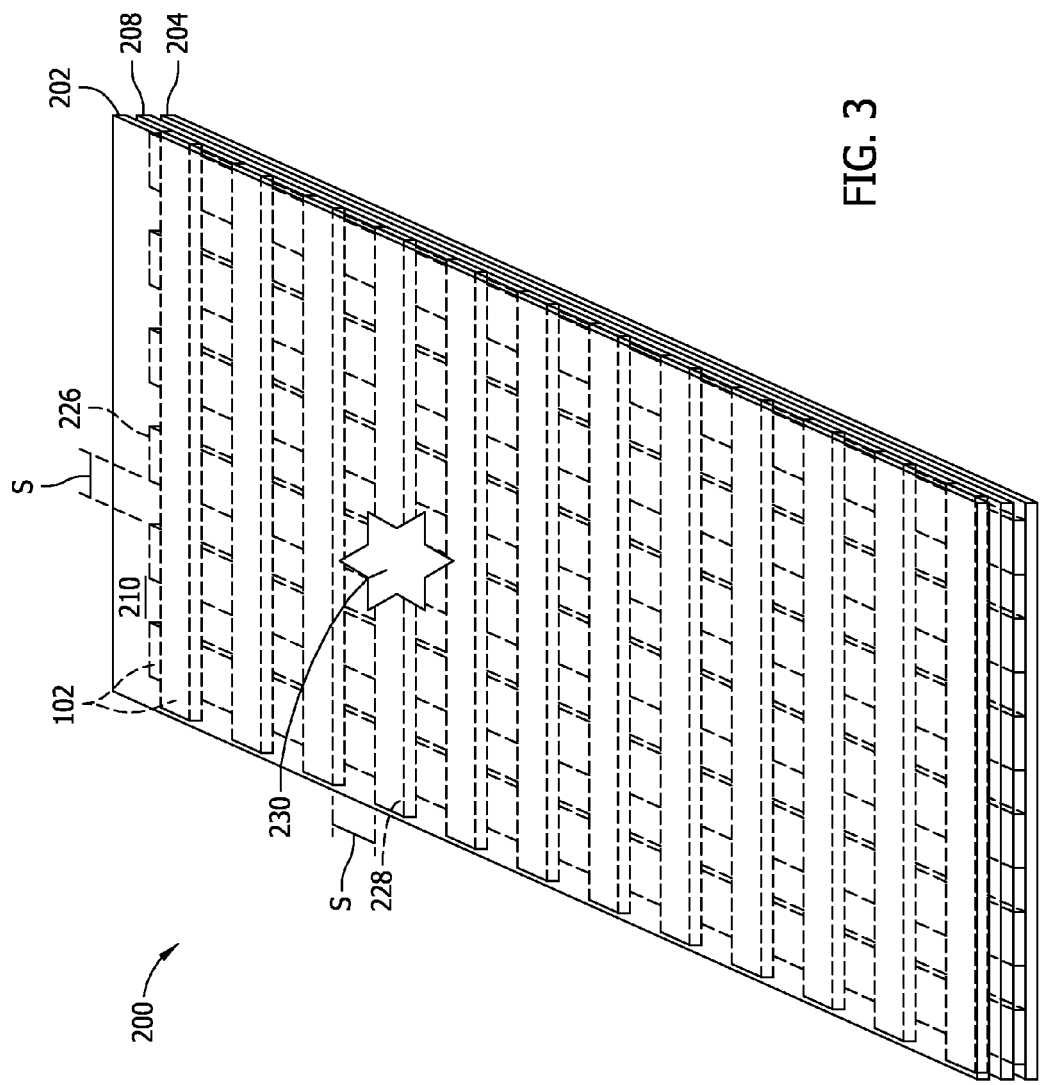
FIG. 3 is an assembled transparent sectional illustration of the structure shown in FIG. 2.
Figure 4:
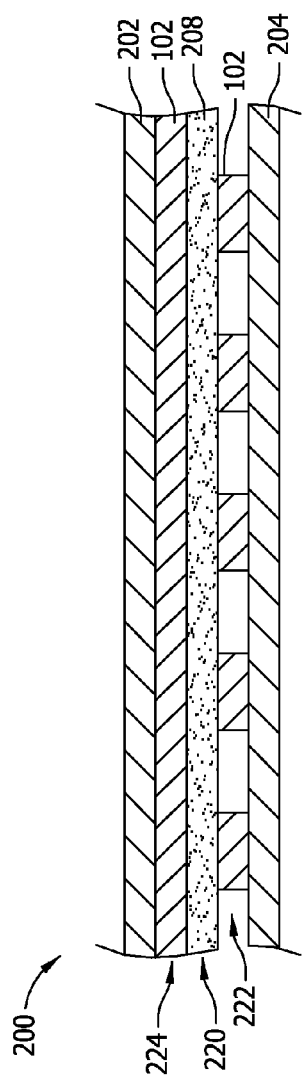
FIG. 4 is a schematic cross-sectional illustration of the structure shown in FIG. 3.

FIG. 2 is an exploded perspective view of an exemplary laminate structure 200, FIG. 3 is an assembled transparent sectional illustration of laminate structure 200, and FIG. 4 is a schematic cross-sectional illustration of laminate structure 200. In the exemplary implementation, laminate structure 200 includes a first layer 202 of material, a second layer 204 of material, and a sensor system 220 coupled therebetween. More specifically, strips 102 of piezoresistive material are positioned over first layer 202, and second layer 204 is positioned over strips 102. As used herein, the term "over" refers to a position above, but not necessarily next to an adjacent component. Although only two layers of material are shown, it should be understood that any number of layers may be used to fabricate laminate structure 200. Further, in some implementations, laminate structure 200 is formed by curing first layer 202, strips 102, and second layer 204 at an elevated temperature for a predetermined duration.

First layer 202 and second layer 204 may be lamina fabricated from any material that enables laminate structure 200 to function as described herein. Exemplary materials include, but are not limited to, a woven cloth material, a fibrous material, a boron material, a fiberglass material, and/or a metallic material. In the exemplary implementation, first layer 202 and second layer 204 are fabricated from a material that is not electrically conductive.

In the exemplary implementation, sensor system 220 includes strips 102 of piezoresistive material coupled to a flex circuit 206. More specifically, strips 102 include a first set 222 of strips 102 that extend in a longitudinal direction 250, and a second set 224 of strips 102 that extend in a transverse direction 252 such that strips 102 are oriented in a grid-like configuration. Further, flex circuit 206 enables strips 102 to be coupled in communication with voltage/current source 106 and resistance detector 110 (shown in FIG. 1). As such, strips 102 and flex circuit 206 are formed as a conducting network of sensors that may be used to monitor the structural integrity of laminate structure 200.

Strips 102 in first set 222 and second set 224 may be oriented at any spacing S that enables sensor system 220 to function as described herein. For example, in some implementations, the dimensions and/or relative spacing S of strips 102 may be increased to enable monitoring of an increased area of laminate structure 200. Further, in some implementations, sensor system 220 may either be distributed as a continuous grid throughout an entire assembly or may be positioned in critical areas of an assembly. For example, critical areas in an aircraft assembly may include, but are not limited to, areas subjected to high-load, areas having a complex geometry, areas that may be prone to impact by foreign objects, and/or areas within movable components such as a rudder and/or elevator assembly.

In some implementations, the type of piezoresistive material used to fabricate strip 102 is selected to ensure a desired sensitivity is achieved to detect strain through the layers of laminate structure 200. For example, in one implementation, laminate structure 200 may have up to about twenty layers of ply material extending at least partially between sensor system 220 and an outer surface (not shown) of laminate structure 200. As such, the piezoresistive material is selected to be sensitive enough to detect strain through the layers when laminate structure 200 is impacted by a foreign object on the outer surface thereof. In the exemplary implementation, the carbon nano-elements have a sensitivity defined within a range between about 0.5 microstrain and about 3 microstrain, and a gauge factor of greater than about 1.

As described above, in the exemplary implementation, strips 102 are fabricated from electrically conductive, carbon nano-element piezoresistive material. Accordingly, in the exemplary implementation, first set 222 and second set 224 of strips 102 are electrically isolated from each other using any suitable method and/or insulator. Electrically isolating first set 222 from second set 224 enables areas of potential damage to be determined by enabling separate resistance measurements to be taken along each affected strip 102. In some implementations, a dielectric material may be used to electrically isolate first set 222 from second set 224. Exemplary dielectric materials include, but are not limited to, a fiberglass material. In the exemplary implementation, a layer 208 of dielectric material extends at least partially between first set 222 and second set 224. In alternative implementations, a coating (not shown) of dielectric material may be applied to each strip 102, and/or the dielectric coating may be applied to strips 102 at contact points between strips 102 of first set 222 and second set 224.

In some implementations, impact from a foreign object (not shown) may create an impact area 230 of damage to laminate structure 200. In operation, sensor system 220 is used to monitor the structural integrity in laminate structure 200. More specifically, sensor system 220 measures the resistance of strips 102 to determine potential damage to laminate structure 200, and determines which strips 102 have the greatest change in resistance. For example, in the exemplary implementation, impact area 230 is created from contact with a foreign object on a surface 210 of first layer 202. The force of the impact at area 230 is transferred through first layer 202 towards strips 102. More specifically, the force of the impact creates the greatest change in resistance of a third longitudinal strip 226 of first set 222 and a fourth transverse strip 228 of second set 224. As such, the location of impact 230 may be determined based on the intersection of third longitudinal strip 226 and fourth transverse strip 228.

Figure 5:
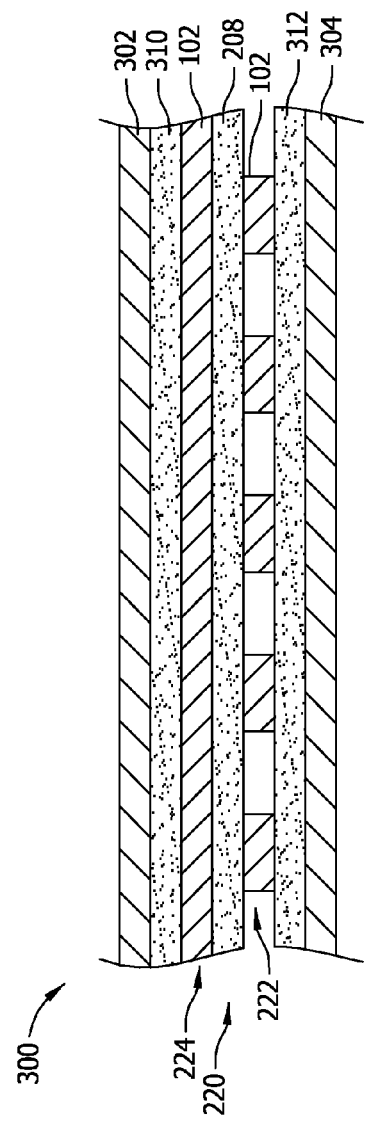
FIG. 5 is a schematic cross-sectional illustration of an alternative structure that may use the sensor shown in FIG. 1.

FIG. 5 is a schematic cross-sectional illustration of an alternative laminate structure 300. In the exemplary implementation, laminate structure 300 includes a first layer 302 of material, a second layer 304 of material, and sensor system 220 indirectly coupled therebetween. More specifically, in the exemplary implementation, first layer 302 and second layer 304 are each fabricated from an electrically conductive material and layers of dielectric material are coupled between strips 102 and first and second layers 302 and 304. For example, a first dielectric layer 310 is coupled between first layer 302 and first set 222 of strips 102, and a second dielectric layer 312 is coupled between second layer 304 and second set 224 of strips 102.

Exemplary electrically conductive materials used to fabricate first layer 302 and second layer 304 include, but are not limited to, a carbon material such as carbon fiber reinforced polymer (CFRP) and/or a graphite material. As described above, in the exemplary implementation, strips 102 are fabricated from electrically conductive, carbon nano-element piezoresistive material that has a substantially similar electrical conductivity as first layer 302 and second layer 304. As such, dielectric layers 310 and 312 are used to electrically isolate strips 102 from first layer 302 and second layer 304. Electrically isolating strips 102 enables the location of potential damage to be determined by enabling separate resistance measurements to be taken along each affected strip 102.

Figure 6:
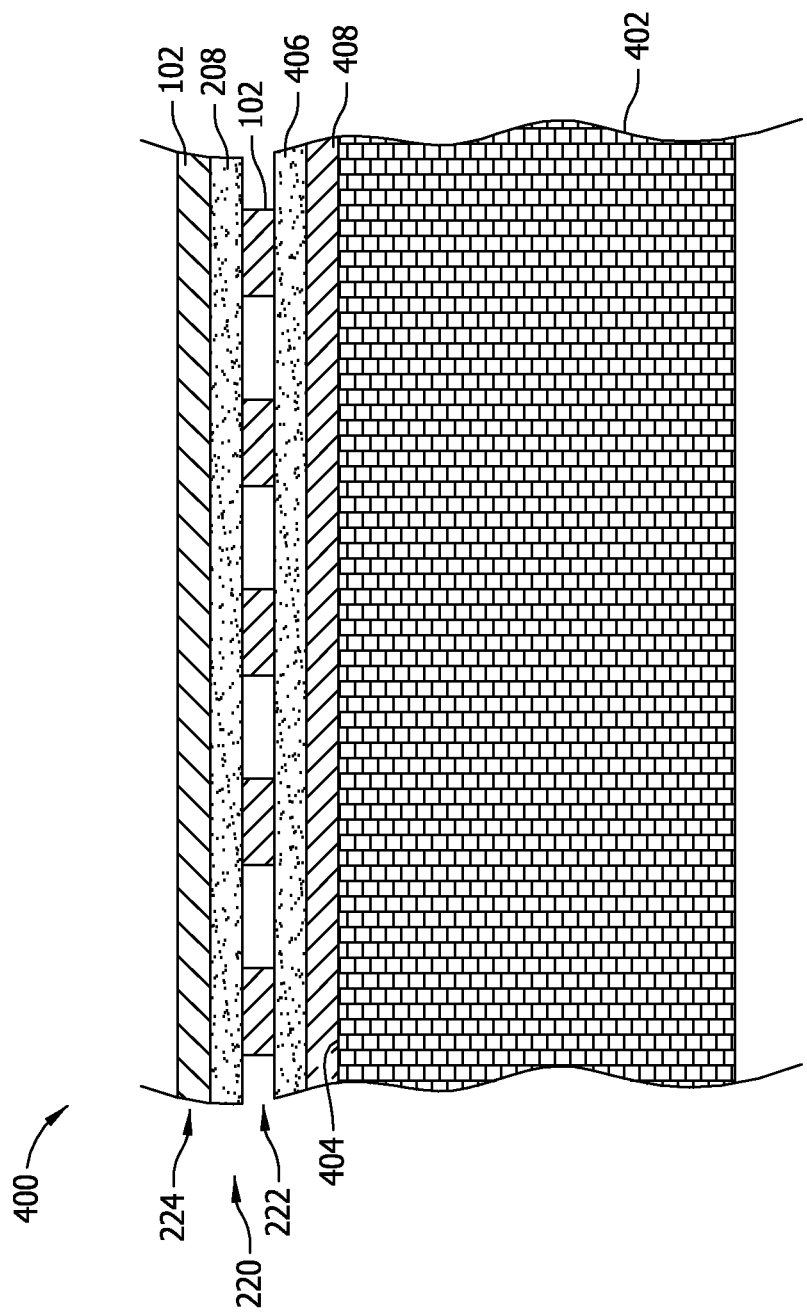
FIG. 6 is a schematic cross-sectional illustration of a further alternative structure that may use the sensor shown in FIG. 1.

FIG. 6 is a schematic cross-sectional illustration of another alternative structure 400. In the exemplary implementation, structure 400 includes a base structure 402 and sensor system 220 is coupled to an outer surface 404 of base structure 402. More specifically, in the exemplary implementation, base structure 402 is fabricated from an electrically conductive material and a layer 406 of dielectric material is coupled between strips 102 and base structure 402. For example, dielectric layer 406 is coupled to second set 224 of strips 102, and an adhesive layer 408 couples sensor system 220 to outer surface 404.

Exemplary electrically conductive materials used to fabricate base structure 402 include, but are not limited to, a carbon material such as carbon fiber reinforced polymer (CFRP) and/or a graphite material. As described above, in the exemplary implementation, strips 102 are fabricated from electrically conductive, carbon nano-element piezoresistive material that has a substantially similar electrical conductivity as base structure 402. As such, dielectric layer 406 is used to electrically isolate strips 102 from base structure 402. Electrically isolating strips 102 enables the location of potential damage to be determined by enabling separate resistance measurements to be taken along each affected strip 102. In an alternative implementation, base structure 402 may be fabricated from a material that is not electrically conductive, and dielectric layer 406 may be omitted from structure 400 such that strips 102 may be coupled directly to outer surface 404 with adhesive layer 408.

Figure 7:
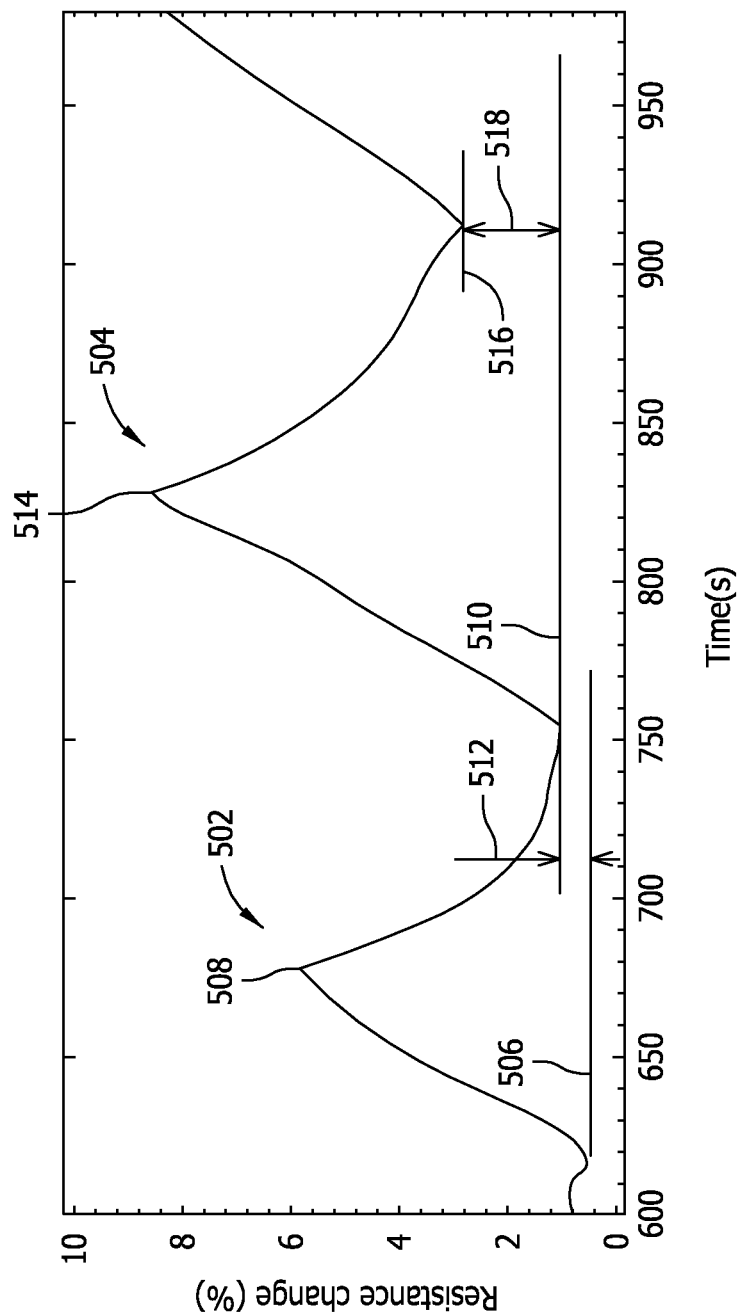
FIG. 7 is a plot illustrating exemplary changes in the resistance of the sensor shown in FIG. 1 under mechanical strain.

FIG. 7 is a plot illustrating exemplary changes in the resistance of a sensor, such as sensor 100 (shown in FIG. 1), under mechanical strain. In operation, a voltage/current source, such as voltage/current source 106, induces a voltage or current to electrodes coupled to a strip, such as strip 102, and a resistance detector, such as resistance detector 110, measures a resistance of each strip as the voltage or current is applied thereto. In the exemplary implementation, a laminate structure, such as laminate structure 200 (shown in FIG. 3), may be subjected to a first impact 502 and a second impact 504 over time, and permanent changes in the resistance of the sensor may indicate the presence of damage to the laminate structure. More specifically, first impact 502 causes a resistance change in the sensor from a first baseline resistance 506 to a first peak resistance change 508 in the form of elastic deformation. The resistance change then decreases from first peak resistance change 508 to a second baseline resistance 510, and a first permanent change in resistance 512 may indicate the presence of damage to the laminate structure. Further, in the exemplary implementation, second impact 504 causes a resistance change in the sensor from second baseline resistance 510 to a second peak resistance change 514 in the form of elastic deformation. The resistance change then decreases from second peak resistance change 514 to a third baseline resistance 516, and a second permanent change in resistance 518 may indicate an accumulation of new damage to the laminate structure.

The systems and methods described herein enable monitoring of the structural integrity of a structure for potential damage. More specifically, the systems described herein include strips of piezoresistive material coupled either between layers of a laminate structure or to an outer surface of a structure. The resistance of the strips may be measured to determine potential damage to the structure. For example, a change in the resistance of the strips when compared to a baseline resistance may be caused by strain applied to the strips from damage to the structure. Further, the strips may be arranged in a grid-like configuration to facilitate locating the damage based on the strain applied to affected strips. More specifically, strips located proximate to the damage may have a greater change in resistance than strips located away from the damage. As such, the systems described herein facilitate determining and locating damage to a structure such that maintenance of the structure may be shifted from a time-based schedule approach, to a condition-based approach.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use in monitoring a structure, said system comprising:
   a plurality of strips of piezoresistive material arranged in a grid-like configuration, each strip comprising a plurality of nano-elements randomly dispersed within a resin material;
   electrodes coupled to each strip; and
   a resistance detector configured to measure a resistance of each strip.

2. The system in accordance with claim 1, wherein each strip comprises a plurality of carbon nano-elements randomly dispersed within the resin material.

3. The system in accordance with claim 1, wherein each strip of piezoresistive material has a gauge factor of greater than about 1.

4. The system in accordance with claim 1, wherein said resistance detector is configured to determine potential damage including at least one of an impact by a foreign object, delamination of layers used to form the structure, and micro-cracks in the structure.

5. The system in accordance with claim 1, wherein said resistance detector is further configured to detect strain applied to each strip.

6. A method of monitoring a structure, said method comprising:
coupling a plurality of strips of piezoresistive material to the structure such that the plurality of strips are oriented in a grid-like configuration, each strip of piezoresistive material including a plurality of nano-elements randomly dispersed within a resin material;
inducing at least one of voltage and current to each strip; and
measuring a resistance of each strip as the at least one of voltage and current is applied thereto, wherein a change in the resistance determines potential damage to the structure.

7. The method in accordance with claim 6 further comprising:
locating the potential damage based on a change in the resistance of the plurality of strips, wherein strips located proximate to the potential damage have a greater change in resistance than strips located away from the potential damage.

8. The method in accordance with claim 6, wherein coupling a plurality of grips comprises coupling at least one strip to an outer surface of the structure.

9. The method in accordance with claim 6, wherein coupling a plurality of strips comprises coupling at least one strip between layers of material used to form the structure.

10. The method in accordance with claim 6, wherein measuring a resistance comprises comparing the resistance to a baseline resistance of each strip, wherein a permanent change between the resistance and the baseline resistance determines damage to the structure.

11. The method in accordance with claim 6, wherein measuring a resistance comprises determining potential damage including at least one of an impact by a foreign object, delamination of layers used to form the structure, and micro-cracks in the structure.

* * * * *